US011265287B2

(12) United States Patent
Zhang et al.

(10) Patent No.: US 11,265,287 B2
(45) Date of Patent: Mar. 1, 2022

(54) PACKET SENDING METHOD AND DEVICE

(71) Applicant: Huawei Technologies Co., Ltd., Shenzhen (CN)

(72) Inventors: Yongkang Zhang, Nanjing (CN); Xia Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/857,825

(22) Filed: Apr. 24, 2020

(65) Prior Publication Data
US 2020/0252366 A1 Aug. 6, 2020

Related U.S. Application Data

(63) Continuation of application No. PCT/CN2018/099413, filed on Aug. 8, 2018.

(30) Foreign Application Priority Data

Oct. 27, 2017 (CN) .......................... 201711025021.9

(51) Int. Cl.
*H04L 29/12* (2006.01)
*H04L 29/06* (2006.01)
(Continued)

(52) U.S. Cl.
CPC ...... *H04L 61/2046* (2013.01); *H04L 49/3009* (2013.01); *H04L 67/42* (2013.01)

(58) Field of Classification Search
CPC ......... H04L 12/00; H04L 12/02; H04L 12/16; H04L 12/18; H04L 12/1863–1877;
(Continued)

(56) References Cited

U.S. PATENT DOCUMENTS 7,047,315 B1  5/2006  Srivastava
7,512,702 B1  3/2009  Srivastava et al.
(Continued)

FOREIGN PATENT DOCUMENTS

CN    1486094 A     3/2004
CN  101729307 A     6/2010
(Continued)

OTHER PUBLICATIONS

Previdi, S., Ed., et al., "IPv6 Segment Routing Header (SRH)," draft-ietf-6man-segment-routing-header-05, Aug. 5, 2017, 28 pages.
(Continued)

*Primary Examiner* — Boris D Grijalva Lobos
(74) *Attorney, Agent, or Firm* — Conley Rose, P.C.

(57) ABSTRACT

A packet sending method includes obtaining, by a client device, an Internet Protocol (IP) anycast address of the anycast server cluster and an IP unicast address of the target server, generating, by the client device, an IP detection packet, where the IP detection packet is used to detect whether the target server is reachable based on the IP anycast address, and the IP detection packet includes the IP anycast address and the IP unicast address of the target server, and instructs the target server to replace the IP unicast address of the target server with the IP anycast address, and sending, by the client device, the IP detection packet to the target server.

20 Claims, 9 Drawing Sheets

(51) Int. Cl.
*H04L 12/935* (2013.01)
*H04L 61/5046* (2022.01)
*H04L 49/00* (2022.01)
*H04L 67/01* (2022.01)

(58) Field of Classification Search
CPC ..... H04L 61/00; H04L 61/20; H04L 61/2046; H04L 61/2069; H04L 61/60; H04L 61/6018; H04L 61/6059; H04L 67/00; H04L 67/42
See application file for complete search history.

(56) References Cited

U.S. PATENT DOCUMENTS

| | | | |
|---|---|---|---|
| 2004/0063402 | A1 | 4/2004 | Takeda et al. |
| 2008/0123640 | A1* | 5/2008 | Bhatia et al. ................. 370/389 |
| 2012/0317235 | A1 | 12/2012 | Nguyen et al. |
| 2015/0249689 | A1 | 9/2015 | Sparks et al. |
| 2016/0352633 | A1* | 12/2016 | Kapadia et al. ........ H04L 45/64 |
| 2017/0126569 | A1 | 5/2017 | Seed et al. |
| 2018/0062914 | A1* | 3/2018 | Boutros et al. ..... H04L 41/0668 |

FOREIGN PATENT DOCUMENTS

| | | |
|---|---|---|
| CN | 102761618 A | 10/2012 |
| CN | 103650437 A | 3/2014 |
| EP | 2311234 A2 | 4/2011 |
| WO | 2008015268 A1 | 2/2008 |
| WO | 2010014912 A2 | 2/2010 |
| WO | 2011044729 A1 | 4/2011 |

OTHER PUBLICATIONS

"Internet Protocol Darpa Internet Program Protocol Specification," RFC 791, Sep. 1981, 49 pages.
Postel, J., et al., "Internet Control Message Protocol," RFC 792, Sep. 1981, 21 pages.
Partridge, C., et al., "Host Anycasting Service," RFC 1546, Nov. 1993, 9 pages.
Deering, S., "Internet Protocol, Version 6 (IPv6) Specification," RFC 2460, Dec. 1998, 39 pages.
Johnson, D., "Reserved IPv6 Subnet Anycast Addresses," RFC 2526, Mar. 1999, 7 pages.
Huitema, C., et al., "An Anycast Prefix for 6to4 Relay Routers," RFC 3068, Jun. 2001, 8 pages.
Hardie, T., "Distributing Authoritative Name Servers via Shared Unicast Addresses," RFC 3258, Apr. 2002, 11 pages.
Kim, D., et al., "Anycast Rendevous Point (RP) mechanism using Protocol Independent Multicast (PIM) and Multicast Source Discovery Protocol (MSDP)," RFC 3446, Jan. 2003, 7 pages.
Hinden, R., "IP Version 6 Addressing Architecture," Request for Comments: 4291, Feb. 2006, 25 pages.
Conta, A., "Internet Control Message Protocol (ICMPv6) for the Internet Protocol Version 6 (IPv6) Specification," RFC 4443, Mar. 2006, 24 pages.
Farinacci, D., "Anycast-RP Using Protocol Independent Multicast (PIM)," RFC 4610, Aug. 2006, 12 pages.
Kaeo, M., "Current Operational Security Practices in Internet Service Provider Environments," RFC 4778, Jan. 2007, 37 pages.
Abley, J., et al., "Operation of Anycast Services," Request for Comments: 4786, Dec. 2006, 24 pages.
Davies, E., "IPv6 Transition/Coexistence Security Considerations," RFC 4942, Sep. 2007, 41 pages.
Abley, J., "Deprecation of Type 0 Routing Headers in IPv6," RFC 5095, Dec. 2007, 7 pages.
McPherson, D., et al., "Architectural Considerations of IP Anycast," RFC 7094, Jan. 2014, 22 pages.
Mizrahi, T., "An Overview of Operations, Administration, and Maintenance (OAM) Tools," RFC 7276, Jun. 2014, 53 pages.
Davies, E., et al, "IPv6 Transition/Co-existence Security Considerations," draft-ietf-v6ops-security-overview-02.txt, Jul. 18, 2005, 33 pages.

* cited by examiner

PACKET SENDING METHOD AND DEVICE

CROSS-REFERENCE TO RELATED APPLICATIONS

This application is a continuation application of International Patent Application No. PCT/CN2018/099413, filed on Aug. 8, 2018, which claims priority to Chinese Patent Application No. 201711025021.9, field on Oct. 27, 2017. The disclosures of the aforementioned applications are hereby incorporated by reference in their entireties.

TECHNICAL FIELD

The present disclosure relates to the field of communications technologies, and specifically, to a packet sending method and a client device.

BACKGROUND

Internet Protocol (IP) anycast is a network addressing and routing method, in which a data packet from a transmit end (or a client) device is routed to any one of several destination nodes (or servers) based on a policy of shortest path, lowest cost, healthiest, least congestion routing, or some other distance measurement policies. The IP anycast is an operation of providing a same designate service address at a plurality of discrete and autonomous locations. The service address may be an IP version 6 (IPv6) address (in this case, the IP anycast is referred to as IPv6 anycast), or may be an IP version 4 (IPv4) address (in this case, the IP anycast is referred to as IPv4 anycast). The IP anycast is generally used to provide high reliability and load balancing, and is widely deployed in existing networks. For example, in a Domain Name System (DNS) root server, and network scenarios such as a Protocol Independent Multicast (PIM) network scenario, a Multicast Source Discovery Protocol (MSDP) network scenario, and a 6 to 4 network scenario that supports transition from an IPv6 to an IPv4, an IP anycast address is used.

However, an IP anycast address identifies a server group rather than a server. In other words, a cluster of servers share an IP anycast address. Therefore, in an existing IP ping/ tracert detection method in which the IP anycast address is used as a destination address (DA), IP anycast address reachability of a designate anycast server in the server cluster cannot be accurately detected.

SUMMARY

Embodiments of the present disclosure provide a packet sending method and a client device, to help resolve a problem that IP anycast address reachability of a designate anycast server cannot be accurately detected in an anycast service-based network.

To resolve the foregoing problem, a first aspect of the embodiments of the present disclosure provides a packet sending method, applied to an anycast service-based network. The network includes a client device and an anycast server cluster, the anycast server cluster includes at least two servers, the at least two servers have a same IP anycast address, and the method includes obtaining, by the client device, the IP anycast address of the anycast server cluster and an IP unicast address of a target server, generating, by the client device, an IP detection packet, where the IP detection packet is used to detect whether the target server is reachable based on the IP anycast address, and the IP detection packet includes the IP anycast address and the IP unicast address of the target server, and instructs the target server to replace the IP unicast address of the target server with the IP anycast address, and sending, by the client device, the IP detection packet to the target server.

The IP detection packet carries the IP anycast address and the IP unicast address of the target server, and instructs the target server to replace the IP unicast address of the target server with the IP anycast address. This helps accurately detect IP anycast address reachability of a designate anycast server.

In a possible design, the obtaining, by the client device, the IP anycast address of the anycast server cluster and an IP unicast address of the target server includes obtaining, by the client device, the IP anycast address and the IP unicast address of the target server using a user-configured command line, or receiving, by the client device, a message sent by a control management device, and obtaining the IP anycast address and the IP unicast address of the target server from the message.

A to-be-detected server in the anycast server cluster may be flexibly designated as required by configuring a command line or receiving a configuration parameter sent by the control management device.

In a possible design, that the IP detection packet includes the IP anycast address and the IP unicast address of the target server, and instructs the target server to replace the IP unicast address of the target server with the IP anycast address includes a destination IP address field in the IP detection packet carries the IP unicast address of the target server, a segment list field in an IP Segment Routing Header (SRH) in the IP detection packet carries the IP anycast address, a value of a segment left SegLeft field in the IP SRH is 1, and the value of the SegLeft field instructs the target server to replace the IP unicast address of the target server with the IP anycast address.

The IP detection packet carries the SRH to carry the IP anycast address, and the value 1 of SegLeft is used to instruct the target server to replace the IP unicast address of the target server with the IP anycast address such that the IP detection packet can be sent to the IP anycast address of a server in the anycast server cluster simply and accurately.

In a possible design, the method further includes obtaining, by the client device, an IP unicast address of at least one designate middle node on a forwarding path from the client device to the target server, and correspondingly, obtaining, by the client device, the IP unicast address of the at least one designate middle node using a user-configured command line, or receiving, by the client device, a message sent by the control management device, and obtaining the IP unicast address of the at least one designate middle node from the message.

A middle node that needs to be included on a to-be-detected path is designated by configuring a command line or receiving a configuration parameter sent by the control management device such that the middle node that needs to be included on the to-be-detected path and a to-be-detected server in the anycast server cluster may be flexibly designated as required.

In a possible design, that the IP detection packet includes the IP anycast address and the IP unicast address of the target server, and instructs the target server to replace the IP unicast address of the target server with the IP anycast address includes a destination IP address field in the IP detection packet carries an IP unicast address of a first designate middle node, and the first designate middle node is a first designate middle node on the forwarding path from the client device to the target server, and a segment list field in an IP SRH in the IP detection packet carries the IP anycast address, the IP unicast address of the target server, and the IP unicast address of the at least one designate middle node, a value of a segment left SegLeft field in the IP SRH is 1 plus a quantity of designate middle nodes, and when the value of the SegLeft field is 1, the value of the SegLeft field instructs the target server to replace the IP unicast address of the target server with the IP anycast address.

The IP detection packet carries the SRH to carry the IP anycast address, the IP unicast address of the designate middle node, and the IP unicast address of the target server, and the value 1 of SegLeft is used to instruct the target server to replace the IP unicast address of the target server with the IP anycast address such that the IP detection packet can be sent to the IP anycast address of a server in the anycast server cluster simply and accurately using the designate middle node.

In a possible design, when receiving, within a predetermined time interval, a response packet sent by the target server, the client device determines that the target server is reachable based on the IP anycast address, when receiving, within the predetermined time interval, no response packet sent by the target server, the client device determines that the target server is unreachable based on the IP anycast address.

Whether the target server is reachable based on the IP anycast address (for example, whether a fault occurs) can be accurately determined based on whether the response packet to IP detection can be received within the predetermined time interval.

According to a second aspect, the present disclosure provides a client device. The client device is configured to perform the method in any one of the first aspect or the possible implementations of the first aspect. Further, the client device includes a module configured to perform the method in any one of the first aspect or the possible implementations of the first aspect.

According to a third aspect, the present disclosure provides a client device. The client device includes a processor, a transceiver, a random access memory, a read-only memory, and a bus. The processor is separately coupled to the transmitter, the random access memory, and the read-only memory using the bus. When the client device needs to be run, a bootloader in a basic input/output system or an embedded system that is built into the read-only memory is used to lead a system to start, and lead the client device to enter a normal running state. After the client device enters the normal running state, an application program and an operating system are run in the random access memory, to enable the processor to perform the method in any one of the first aspect or the possible implementations of the first aspect.

According to a fourth aspect, a client device is provided. The client device includes a central processing unit, a forwarding entry storage, a physical interface network card, and a network forwarding processor. The client device is configured to perform the method in any possible implementation of the first aspect. Further, the client device includes a module configured to perform the method in any one of the first aspect or the possible implementations of the first aspect.

According to a fifth aspect, the present disclosure provides a computer readable medium, including an instruction. When the instruction is run on a computer, the computer is enabled to perform the method in any one of the first aspect or the possible implementations of the first aspect.

BRIEF DESCRIPTION OF DRAWINGS

To describe technical solutions in embodiments of this application or in other approaches more clearly, the following briefly describes the accompanying drawings required for describing the embodiments or other approaches. Apparently, the accompanying drawings in the following description show merely some embodiments recorded in this application, and a person of ordinary skill in the art may still derive other drawings from these accompanying drawings.

DESCRIPTION OF EMBODIMENTS

To enable a person skilled in the art to better understand solutions in the present disclosure, the following describes embodiments of the present disclosure in more detail with reference to accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1A:
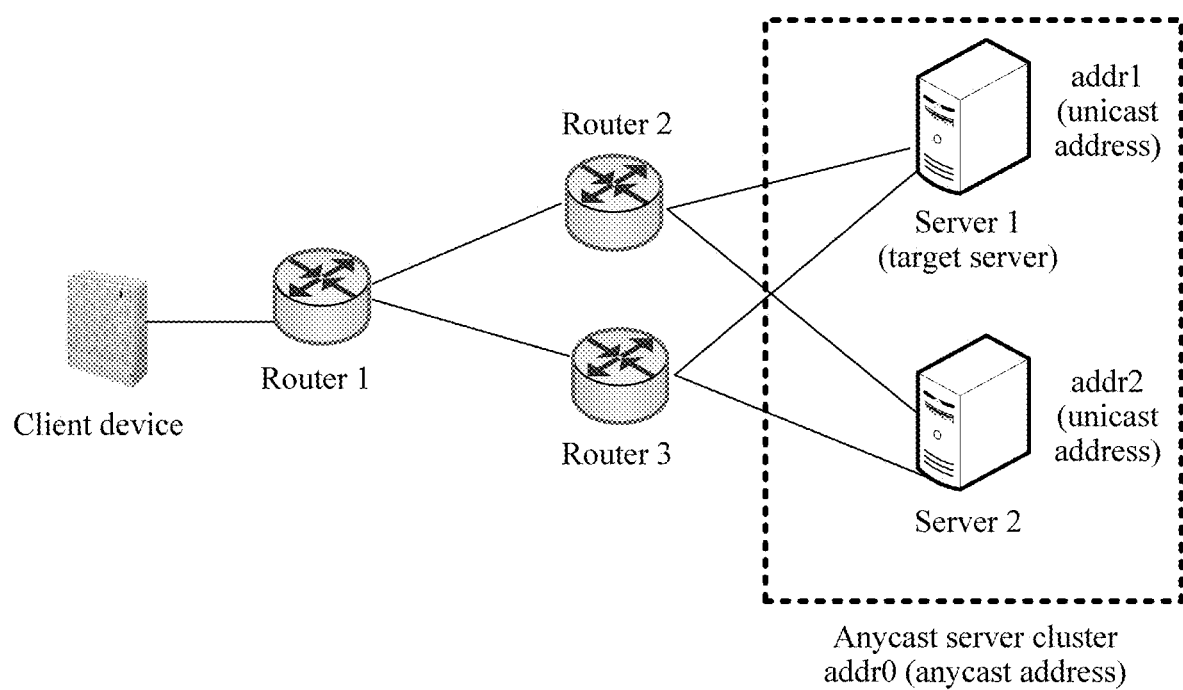
FIG. 1A is a schematic diagram of an application scenario of packet sending according to an embodiment of the present disclosure.

Before the technical solutions of the embodiments of the present disclosure are described, an application scenario related to the embodiments of the present disclosure is explained first. The present disclosure is applied to an IP anycast service network. The IP anycast service network includes a client device, an anycast server cluster, and a routing device (for example, a router or a switch). As shown in FIG. 1A, a client device accesses a server 1 and a server 2 in the anycast server cluster using a routing network including a router 1, a router 2, and a router 3. An IP anycast address addr0 is used to identify the anycast server cluster and is shared between the server 1 and the server 2. An IP unicast address addr1 is used to identify the server 1, and may be, for example, an IP address of a network interface on the server 1. An IP unicast address addr2 is used to identify the server 2, and may be, for example, an IP address of a network interface on the server 2.

An IPv6 anycast address and an IPv6 unicast address use same address space. Except a reserved subnet anycast address defined in Internet Engineering Task Force (IETF) request for comments (RFC) 2526 and a subnet-router anycast address defined in RFC 4291, the IPv6 anycast address has no obvious feature. When a unicast address is assigned to a plurality of interfaces (on a same device or different devices), whether the unicast address is an IP anycast address needs to be indicated through explicit configuration.

The IPv6 anycast address is usually configured on a plurality of interfaces to represent a group of servers that provide a same service externally. When the IP anycast address is used as a DA, a "nearest" device is selected using a routing algorithm for access. In this way, a distributed service is implemented, and advantages of load balancing and high reliability are achieved.

For an IPv6 anycast service, because the IPv6 anycast address is essentially an IPv6 unicast address, an IPv6 ping/tracert IP detection packet may be used to detect the IPv6 anycast address. A method for detecting the IPv6 anycast address is the same as a method for detecting a common unicast address. The client device may detect, using the IPv6 anycast address as a destination IP address, whether the IPv6 anycast service is reachable. For example, as shown in FIG. 1A, the client device generates a routing entry whose destination IP is addr0 using a dynamic routing protocol (or through static route configuration), and instructs the routing device (the routers 1, 2, and 3) to forward, to the server 1, an IP detection packet sent by the client device. If the server 1 works normally, the IPv6 anycast service is reachable. In this case, because the routing entries whose destination IPs are addr0 on the router 1, the router 2, and the router 3 all point to the server 1, whether the server 2 is reachable from the client device cannot be detected for a user as expected.

After a fault occurs on the server 1, a routing entry whose destination IP is addr0 is regenerated through route reconvergence, and the routing device is instructed to forward, to the server 2, an IP detection packet sent by the client device. If the server 2 works normally, the IPv6 anycast service is reachable. Therefore, provided that any server in the anycast server cluster works normally, the anycast service is reachable in ping/tracert detection. In this way, the anycast service has an advantage of high reliability. However, in this case, because the routing entries whose destination IPs are addr0 on the router 1, the router 2, and the router 3 all point to the server 2 (in other words, the packet may finally reach the server 2 after being forwarded based on outbound interfaces in the routing entries), whether the server 1 is reachable from the client device cannot be detected for a user as expected.

Therefore, in the existing ping/tracert detection method in which an IP anycast address is used as a DA, a ping/tracert IP detection packet cannot be accurately sent to a designate server as required. Further, it cannot be learned whether a designate server in the anycast server cluster is faulty.

It should be noted that the client device in this application is a device that supports IP anycast. For example, the client device may be a personal computer (PC), a laptop, or a PAD in a broadband access network, a router or a switch in a routing network, a sensor or an Internet of Things (IoT) gateway in an IoT network, or a base station or a mobile phone in a mobile network. The anycast server cluster in this application may include at least two servers. FIG. 1A shows two devices only for example, which does not constitute any limitation. Certainly, the anycast server cluster may alternatively be another network device cluster that supports the IP anycast service, for example, a router or switch cluster. The server, the router, and the switch may be physical devices, or may be virtual devices implemented based on a virtualization technology (for example, a virtual server, a virtual router, and a virtual switch).

The foregoing describes a possible application scenario related to the present disclosure. Before the embodiments of the present disclosure are described in detail, an IP segment routing (SR) technology is briefly described first. IP forwarding is basically characterized by connectionless and hop-by-hop forwarding. A forwarding path of an IP packet is obtained by completely relying on advertisement and convergence of a route (a static route and/or a dynamic route). Generally, a route calculation system selects a "shortest path". However, in some scenarios, the "shortest path" may not meet a user expectation, and some difficulties may be encountered in implementing traffic engineering (TE). To overcome the above limitations of the IP forwarding mechanism to some extent, IP source routing is proposed. The IP source routing supports direct addition of information about a forwarding path to an IP packet.

In IPv4, to support source routing, a loose source routing (LSRR) option and a strict source routing (SSRR) option are defined in RFC 791. However, practicability is limited by a maximum space of 40 bytes of an IPv4 option.

In IPv6, to support source routing, a routing header is defined in RFC 2460 published by the IETF, and a new source routing mechanism may be added by defining a new routing type. In addition, a routing header whose route type is 0 (type 0) is defined in RFC 2460. The type 0 routing header is basically equivalent to the LSRR in IPv4, but is not limited by the 40-byte space of the IPv4 option.

However, after further analysis, the IETF finds that the type 0 routing header in IPv6 has a serious security problem. Therefore, a definition of the type 0 routing header is abandoned in RFC 5095, but an IPv6 routing header mechanism is not abandoned.

Figure 1B:
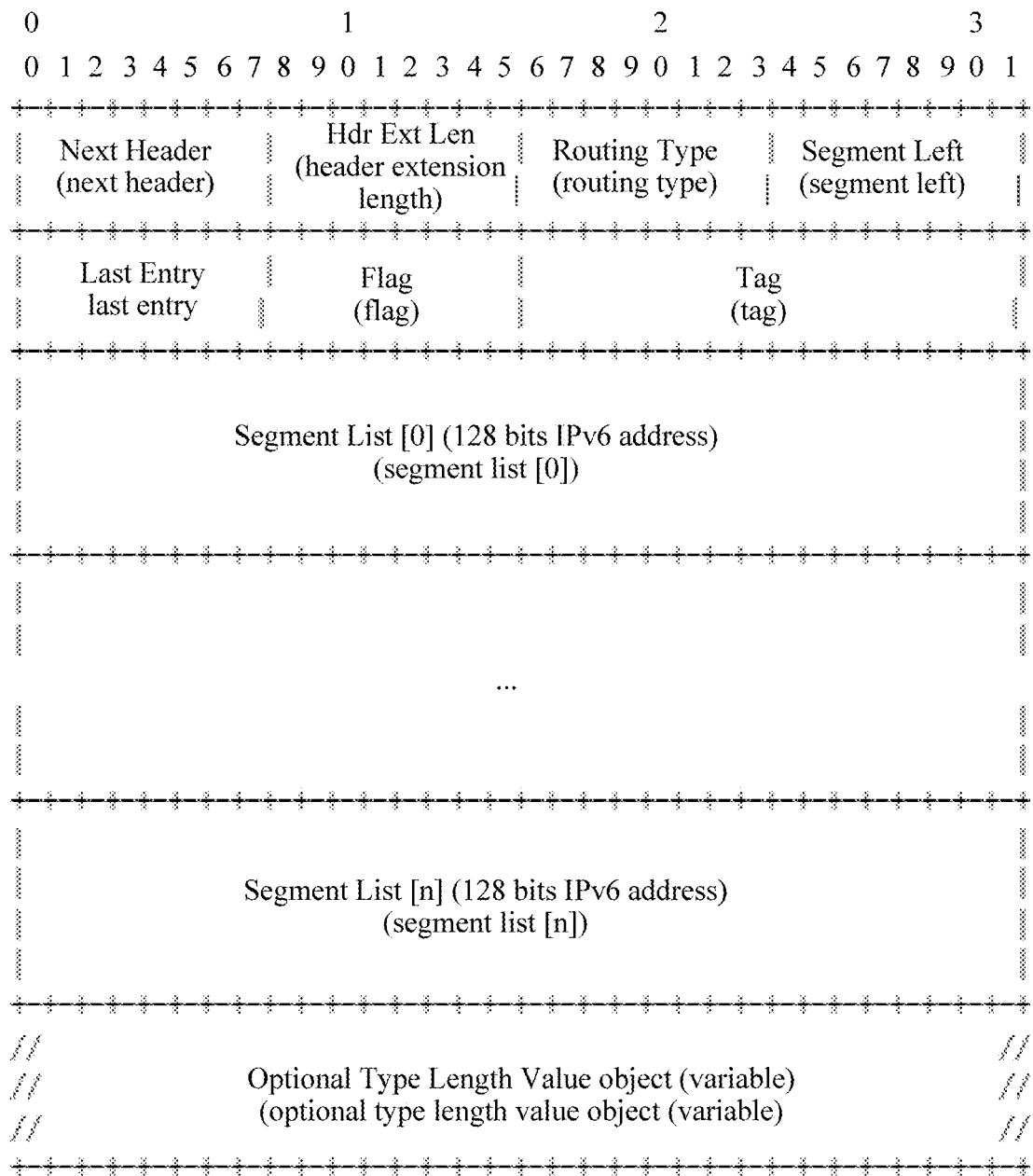
FIG. 1B is a schematic structural diagram of an SRH packet header according to an embodiment of the present disclosure.

The IPv6 routing header is a source routing mechanism in a loose mode. With further development of an IP network, increasing attention is paid to the source routing idea. For this reason, the IETF established a Source Packet Routing in Networking (SPRING) working group to implement related standardization work. The SPRING working group refers to a newly designed source routing mechanism as SR. A data plane uses two modes Multiprotocol Label Switching (MPLS) and IPv6. SR in the IPv6 mode (SR IPv6) is implemented by defining a new IPv6 SRH. Refer to draft-ietf-6man-segment-routing-header-07 (the draft is defined by the 6man working group). As shown in FIG. 1B, an SRH extension header includes a next header field, a segment left field, and a segment list (Segment List [n]) field. The next header field indicates a protocol header carried behind an SRH. The segment list field carries an IP address of each node (except a source node) that needs to be included on a forwarding path, and is expressed in an array form. An index value of the array ranges from 0 to n, and n is a positive integer. n+1 represents a quantity of designate nodes that need to be included on the forwarding path except the source node. The segment left field indicates the index of the array.

The following describes a processing procedure of the SRH extension header using an example. After receiving an IP packet, when determining that a destination IP address carried in an IP packet header is equal to a local IP address of the network node, the network node continues to determine whether a value of the segment left field (referred to as a segment left value for short) is greater than 0. If the segment left value is greater than 0, the segment left value is subtracted by 1, and the network node replaces the destination IP address in the IP packet header with an IP address corresponding to Segment List [the segment left value subtracted by 1], and performs corresponding packet processing by searching a forwarding information base (FIB) table using the updated destination IP address.

Figure 1C:
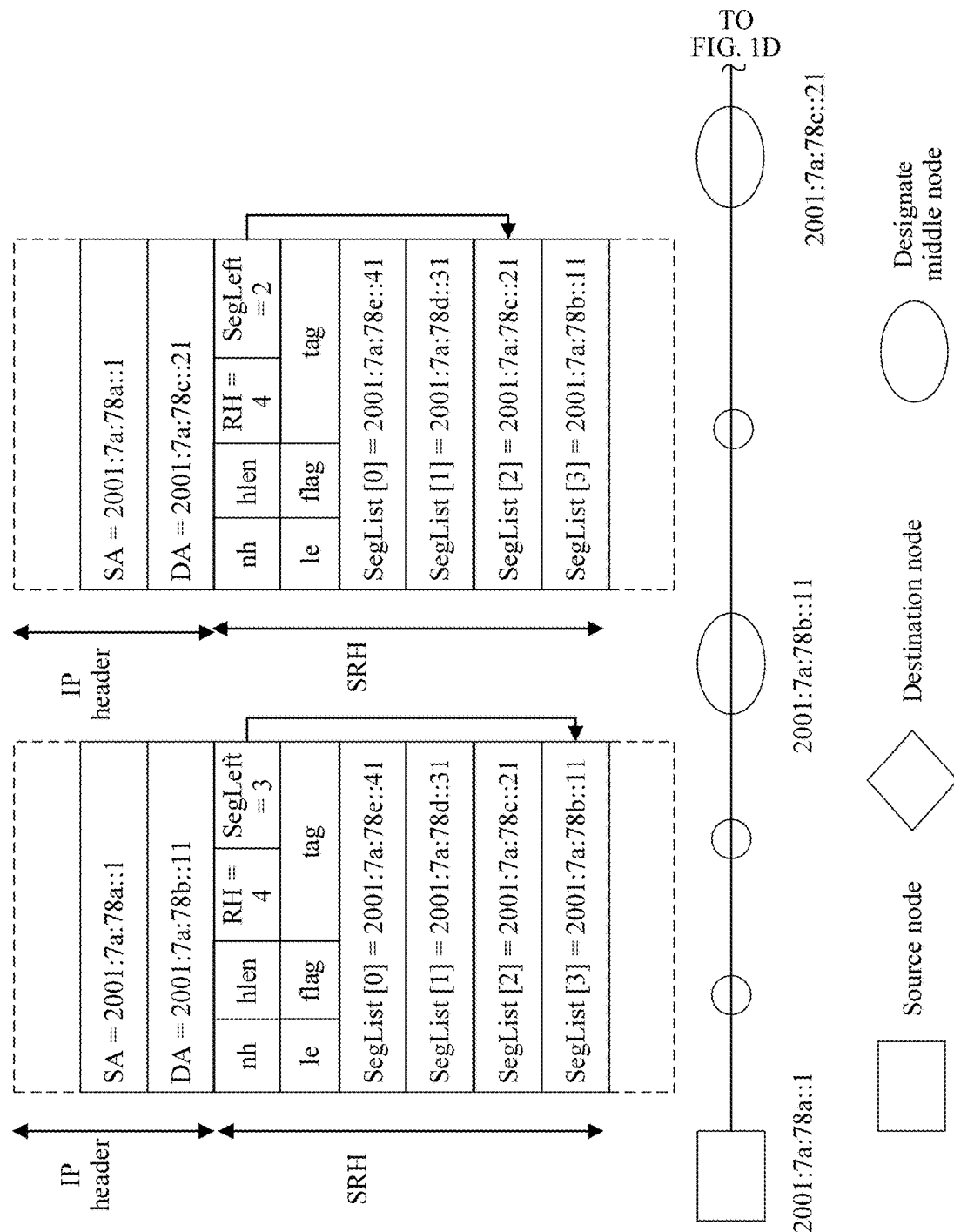
FIG. 1C and FIG. 1D are a schematic flowchart of SRH forwarding according to an embodiment of the present disclosure.
Figure 1D:
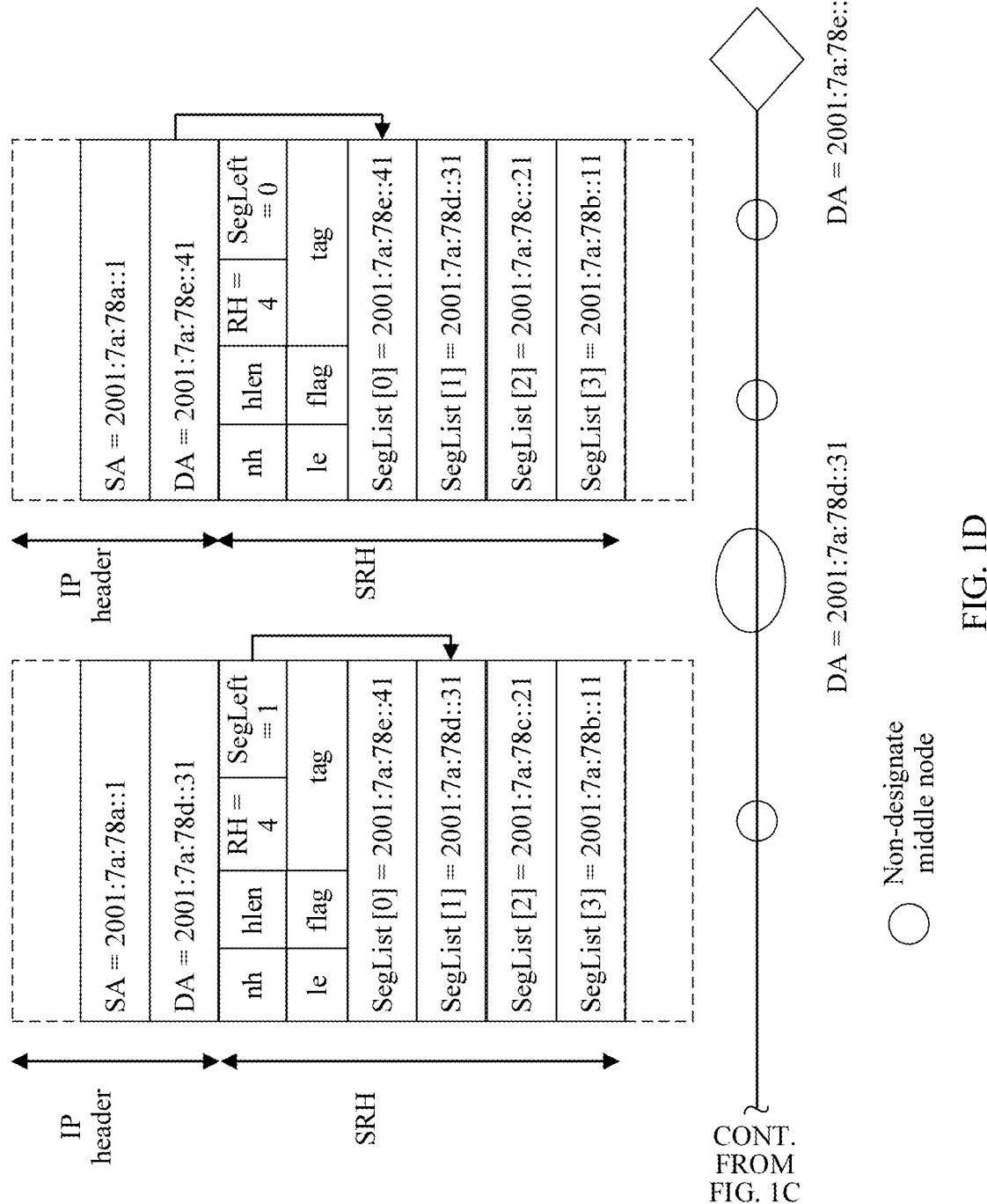

A forwarding procedure of an IPv6 packet that carries an SRH is described in detail using a network scenario shown in FIG. 1C and FIG. 1D as an example. For example, a packet is sent from a source node (whose IPv6 address is 2001:7a:78a::1) to a destination node (whose IPv6 address is 2001:7a:78e::41) through three designate middle nodes (the nodes may be network routing and switching devices such as a router and a switch) and several non-designate middle nodes. The designate middle node refers to a node that is designated in advance as needing to be included on a path from the source node to the destination node. The non-designate middle node refers to a node that is not designated in advance as needing to be included on the path from the source node to the destination node, but a node that is determined by searching an IP routing and forwarding table as needing to be included on the path. It is assumed that IP addresses of the three designate middle nodes are 2001:7a: 78b::11 (a first designate middle node), 2001:7a:78c::21 (a second designate middle node), and 2001:7a:78d::31 (a third designate middle node). The source node sends, to the first designate middle node, a first IPv6 packet that carries an SRH extension header. A source address (SA) field in the IPv6 packet header is the IPv6 address of the source node (SA=2001:7a:78a::1), and a DA field is the IPv6 address of the first designate middle node (DA=2001:7a:78b::11). The SRH extension header includes Segment Left (SegLeft, whose value is 3) and Segment List (SegList). An index of the SegList array ranges from 0 to 3, SegList [3] to SegList [0], which sequentially represent IPv6 addresses of nodes that need to be included on the forwarding path. SegList [3] is the IPv6 address of the first designate middle node. SegList [2] is the IPv6 address of the second designate middle node. SegList [1] is the IPv6 address of the third designate middle node. SegList [0] is the IPv6 address of the final destination node.

After receiving the first IPv6 packet, the first designate node finds that the DA carried in the first IPv6 packet is the IPv6 address of the first designate node, and continues to parse out SegLeft carried in the SRH extension header. Then, if determining that SegLeft (whose value is 3) is greater than 0, the first designate node subtracts SegLeft by 1 (to obtain 2), and refreshes the value of the DA field to the IPv6 address (the IPv6 address of the second designate middle node) in SegList [SegLeft]=SegList [2]. The first designate node obtains a matched entry by searching a FIB table using the refreshed IPv6 address of the second designate middle node. Further, the first designate node generates a second IPv6 packet, and sends the second IPv6 packet to the second designate middle node based on the matched entry. A SA field in an IPv6 packet header of the second IPv6 packet is the IPv6 address of the source node (SA=2001: 7a:78a::1), and a DA field is the IPv6 address of the second designate middle node (DA=2001:7a). 78c::21). An SRH extension header includes Segment Left (referred to as SegLeft for short, whose value is 2).

After the second designate middle node receives the second IPv6 packet, the second designate middle node performs processing using a method the same as above (for brevity, details are not described herein again), generates a third IPv6 packet, and sends the third IPv6 packet to the third designate middle node. A SA field in an IPv6 packet header of the third IPv6 packet is the IPv6 address of the source node (SA=2001:7a:78a::1), and a DA field is the IPv6 address of the third designate middle node (DA=2001:7a: 78d::31). An SRH extension header includes SegLeft whose value is 1.

After the third designate node receives the third IPv6 packet, the third designate middle node performs processing using a method the same as above (for brevity, details are not described herein again), generates a fourth IPv6 packet, and sends the fourth IPv6 packet to the final destination node. A SA field in an IPv6 packet header of the fourth IPv6 packet is the IPv6 address of the source node (SA=2001:7a:78a::1), and a DA field is an IPv6 address of the final destination node (DA=2001:7a:78e::41). An SRH extension header includes SegLeft whose value is 0.

After receiving the fourth IPv6 packet, the final destination node finds that the DA carried in the fourth IPv6 packet is the IPv6 address of the final destination node, and continues to parse out SegLeft carried in the SRH extension header. Then, if determining that SegLeft (whose value is 0) is equal to 0, the final destination node does not process the SRH, and continues to process a remaining part of the fourth IPv6 packet.

The foregoing describes the possible application scenario related to the present disclosure and the SR technology, and based on this, the following further describes the embodiments of the present disclosure in detail.

Figure 2:
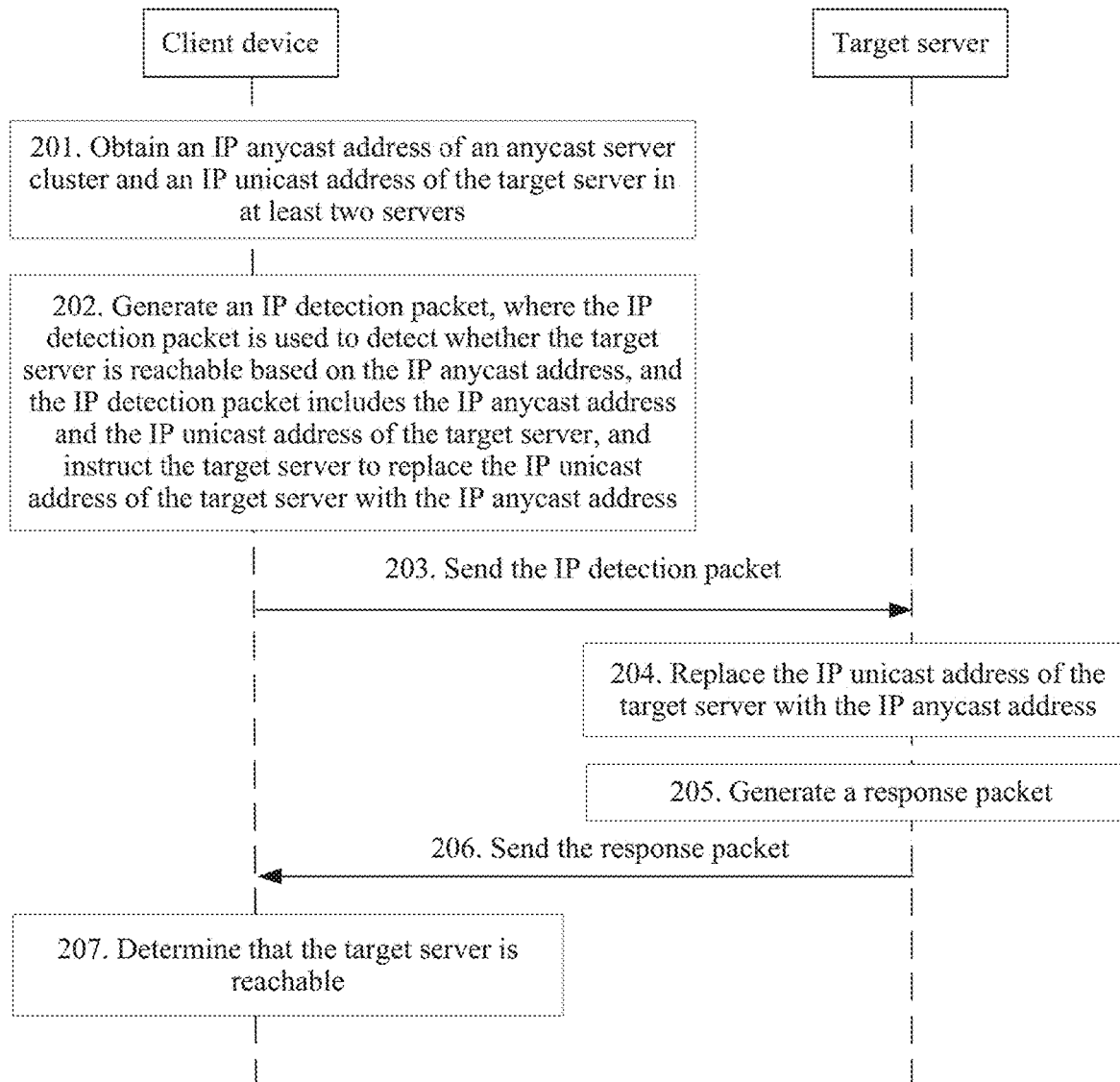
FIG. 2 is a schematic flowchart of a packet sending method according to an embodiment of the present disclosure.

FIG. 2 is a schematic flowchart of a packet sending method according to an embodiment of the present disclosure. The method is applied to an anycast service-based network, the network includes a client device and an anycast server cluster, and the anycast server cluster includes a target server.

The solution provided in this embodiment of the present disclosure includes parts 201, 202, 203, 204, 205, 206, and 207. The following separately describes the parts.

201. The client device obtains an IP anycast address of the anycast server cluster and an IP unicast address of the target server.

The IP anycast address of the anycast server cluster and the IP unicast address of the target server may be configured on the client device by a network administrator using a command line, or may be obtained from a message that is sent by another control management device and that is received by the client device.

In a specific implementation, a command line in the following form is executed on a detection initiating device (the client device)

```
ping ip -exh <addr0><server1-addr>
                or
tracert ip -exh <addr0><server1-addr>
``` where -exh <addr0> is an optional parameter added to indicate that an extension field is carried in an IP detection packet. The extension field may be an extension header. <addr0> is an anycast address encapsulated in the extension field. <server 1-addr> is a non-anycast IP address that is on a server (for example, a server 1) in a detected anycast server cluster and that is used to identify the server 1, for example, an IP address of an interface on the server or a management IP address of the server.

A to-be-detected server in the anycast server cluster may be flexibly designated as required by configuring a command line or by receiving a configuration parameter sent by the control management device.

In another specific implementation, if the client device further obtains an IP unicast address of at least one designate middle node on a forwarding path from the client device to the target server, a command line in the following form is executed on a detection initiating device (the client device)

```
ping ip -exh <addr0><server1-addr> -designate_middlenodes
<node1, ..., nodeN>
                                or
tracert ip -exh <addr0><server1-addr> -designate_middlenode <node1, ...,
nodeN>
``` where -designate_middlenodes is an optional parameter added to indicate that an IP detection packet needs to pass through N designate middle nodes a node 1, . . . , and a node N in sequence. N is a positive integer greater than or equal to 1.

It should be noted that -exh is only an example to indicate that a new extension field needs to be added to the packet, and does not constitute any limitation. For example, if the extension field is an SRH extension header, -exh may be -srh. Similarly, -designate_middlenode is only an example to indicate that an extension field needs to be added to the packet, and does not constitute any limitation.

It should be further noted that ip in the command line may be IPv4 or IPv6, and no limitation is imposed herein.

A middle node that needs to be included on a to-be-detected path is designated by configuring a command line or receiving a configuration parameter sent by the control management device such that the middle node that needs to be included on the to-be-detected path and a to-be-detected server in the anycast server cluster may be flexibly designated as required.

202. The client device generates an IP detection packet, where the IP detection packet is used to detect whether the target server is reachable based on the IP anycast address, and the IP detection packet includes the IP anycast address and the IP unicast address of the target server, and instructs the target server to replace the IP unicast address of the target server with the IP anycast address.

The IP detection packet is a packet used to perform IP reachability detection, for example, a ping or tracert packet. The ping or tracert packet is encapsulated in a payload part of the IP packet.

In a specific implementation, when the path from the client device to the target server does not include a designate middle node, a destination IP address field (a destination IP address field in an IP packet header) in the IP detection packet carries the IP unicast address of the target server. The IP detection packet carries the IP anycast address by carrying a SRH, and instructs the target server to replace the IP unicast address of the target server with the IP anycast address.

Further, a segment list field in the SRH in the IP detection packet carries the IP anycast address, and a value 1 of a segment left SegLeft field in the SRH instructs the target server to replace the IP unicast address of the target server with the IP anycast address. A specific procedure is described in detail using an example in the following part of FIG. 3. It should be noted that the value of the SegLeft field is set to 1 plus a quantity of designate middle nodes. When no middle node is designated, a quantity of designate middle nodes is 0, and the value of the SegLeft field is 0+1=1.

The IP detection packet carries the SRH to carry the IP anycast address, and the value 1 of SegLeft is used to instruct the target server to replace the IP unicast address of the target server with the IP anycast address such that the IP detection packet can be sent to the IP anycast address of a server in the anycast server cluster simply and accurately.

In another specific implementation, when the path from the client device to the target server includes a designate middle node, the value of the SegLeft field in the SRH is 1 plus a quantity of designate included middle nodes. Each time the IP detection packet passes through one middle node, the value of SegLeft is subtracted by 1. When the IP detection packet arrives at the target server, the value of SegLeft is 1, and instructs the target server to replace the IP unicast address of the target server with the IP anycast address. A specific procedure is described in detail in the following part of FIG. 4.

The IP detection packet carries the SRH to carry the IP anycast address, the IP unicast address of the designate middle node, and the IP unicast address of the target server, and the value 1 of SegLeft is used to instruct the target server to replace the IP unicast address of the target server with the IP anycast address such that the IP detection packet can be sent to the IP anycast address of a server in the anycast server cluster simply and accurately using the designate middle node.

203. The client device sends the IP detection packet to the target server.

The IP detection packet carries the IP anycast address and the IP unicast address of the target server, and instructs the target server to replace the IP unicast address of the target server with the IP anycast address. This helps accurately detect IP anycast address reachability of a designate anycast server.

204. The target server receives the IP detection packet, learns through parsing that a destination IP address carried in an IP header of the encapsulated IP detection packet is a local IP unicast address of the target server, and replaces the IP anycast address with the IP unicast address of the target server according to the instruction of replacing the IP anycast address with the IP unicast address of the target server.

205. The target server continues to perform protocol processing on the IP detection packet to generate a response packet.

206. The target server sends the response packet to the client device.

207. When receiving the response packet within a predetermined time interval, the client device determines that the target server is reachable based on the IP anycast address.

In a possible embodiment, when the response packet is not received within the predetermined time interval, the client device determines that the target server is unreachable based on the IP anycast address, for example, a fault occurs.

Whether the target server is reachable based on the IP anycast address (for example, whether a fault occurs) can be accurately determined based on whether the response packet to IP detection can be received within the predetermined time interval.

The foregoing parts 201 to 207 are described using the network scenario shown in FIG. 1A as an example. If the client device (the detection initiating device) needs to detect whether the server 1 in the anycast server cluster works normally, the client device initiates IPv6 ping detection. The IPv6 ping detection may be implemented in two manners. In one manner, a middle node is designated. In the other manner, no middle node is designated.

Figure 3:
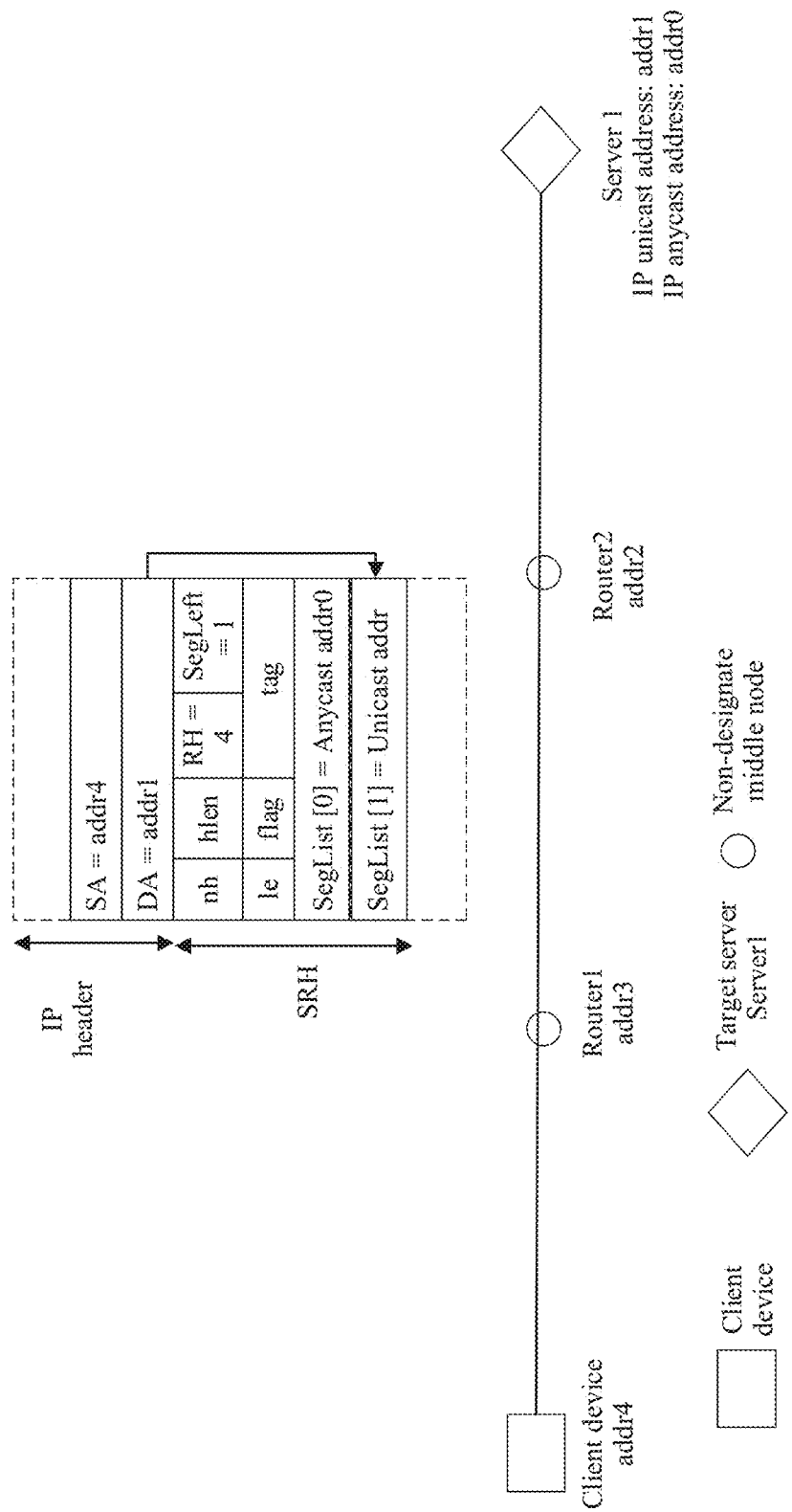
FIG. 3 is a schematic flowchart of forwarding without a designate middle node according to an embodiment of the present disclosure.

A packet forwarding procedure in which no middle node is designated is first described in detail with reference to FIG. 3. The client device executes a command line in the following form ping ipv6-srh <addr0><addr1> where -srh <addr0> is used to indicate that an SRH extension header is carried in an IP detection packet, and an anycast address addr0 is carried in a segment list field in the SRH. For example, as shown in FIG. 3, a value of a segment left field is set to 1, and addr0 is carried in a Segment List [0] field. A DA field in an IPv6 packet header carries addr1. addr1 is a non-anycast IP address that is on the server 1 in the detected anycast server cluster and that is used to identify the server 1. A next header field in the SRH indicates the Internet Group Management Protocol (IGMP). In an embodiment, a ping packet may continue to be encapsulated in the IPv6 packet. add1 is an IP unicast address that is on the server 1 in the detected anycast server cluster and that is used to identify the server 1.

The client device generates the IPv6 packet used to perform ping detection. Because a segment left value in the SRH in the IPv6 packet is 1, greater than 0, it means that when an IP address of the target server is addr1, the client device continues to parse the SRH, subtracts the segment left value in the SRH by 1, and replaces the destination IP address in the IPv6 packet header with an IP address corresponding to Segment List [the segment left value subtracted by 1] (=Segment List [0]=addr0), in an embodiment, replaces addr1 in the IPv6 packet header with addr0.

The client device sends the IPv6 packet to the server 1. In a network including R1, R2, and R3, the IPv6 packet is sent to the server 1 through R1 and R2 by searching for a routing and forwarding entry corresponding to the destination IP address addr1.

After receiving the IPv6 packet, the server 1 finds, through parsing, that a DA (addr1) carried in the IPv6 packet is an IPv6 address of the server 1, and continues to parse out SegLeft carried in the SRH extension header. A value of SegLeft is 1, greater than 0. Therefore, it means that when the IP address of the target server is addr1, the server 1 continues to parse out the SRH, subtracts the segment left value in the SRH by 1, and replaces the destination IP address in the IPv6 packet header with an IP address corresponding to Segment List [the segment left value subtracted by 1] (=Segment List [0]=addr0), in an embodiment, replaces addr1 in the IPv6 packet header with addr0.

The server 1 continues to perform protocol processing on the ping detection packet, generates a response packet, and sends the response packet to the client device. After receiving the response packet, the client device determines that the target server is reachable.

Through FIB table search based on addr1 used as a DA and forwarding by the router 1 and the router 2, the ping detection packet is sent to the server 1. When the server 1 is faulty, the server 1 cannot receive and process the IPv6 packet, nor generate the response packet and send the response packet to the client device. Therefore, when the client device fails to receive the response packet of the server 1 within a time interval or a period, it is determined that the server 1 is unreachable, and a fault may occur.

It should be noted that the segment list array may carry addr1 (as shown in FIG. 3), or may not carry addr1, and a same function may be implemented in both cases.

Figure 4:
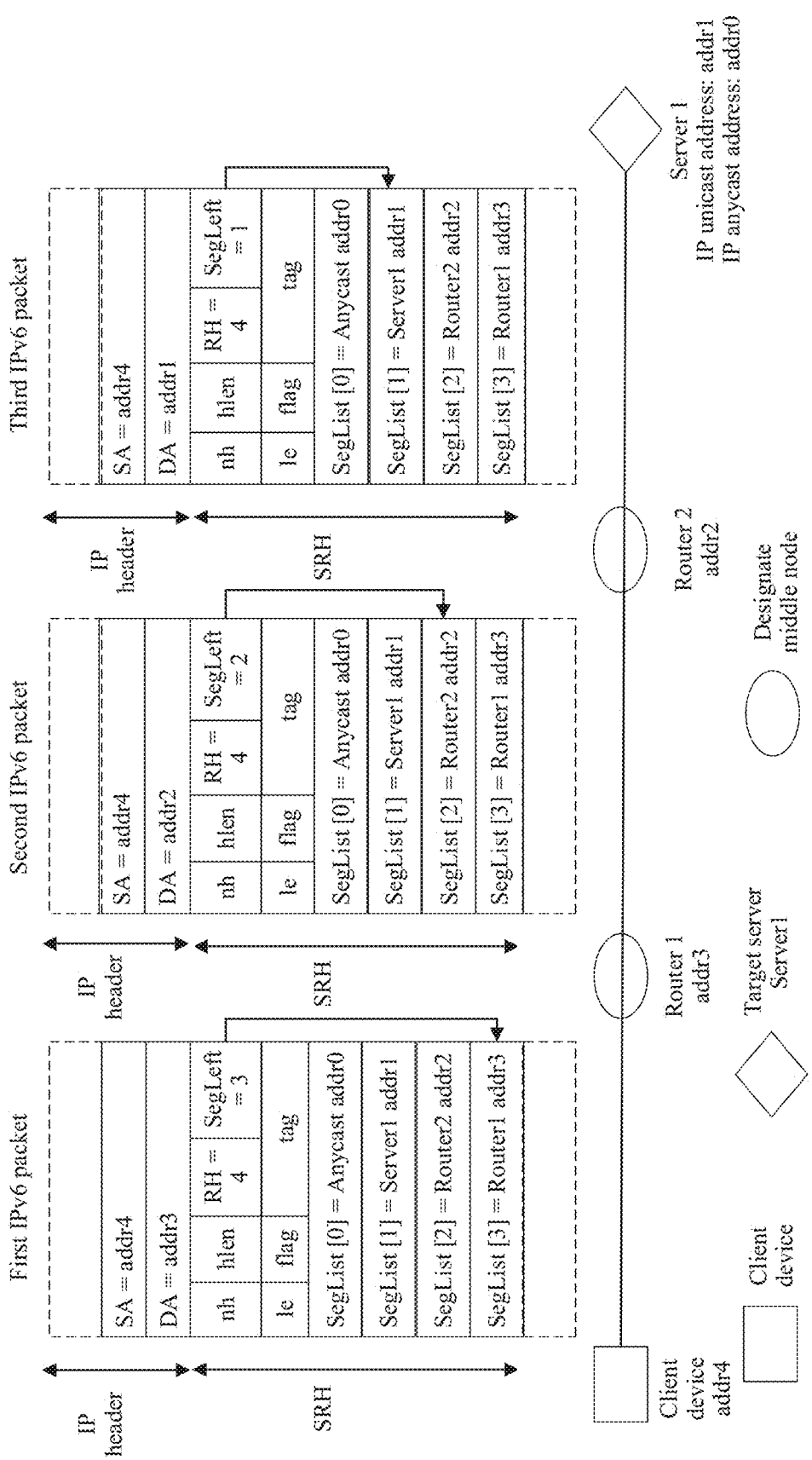
FIG. 4 is a schematic flowchart of forwarding with a designate middle node according to an embodiment of the present disclosure.

Next, another packet forwarding procedure in which a middle node is designated is described in detail with reference to FIG. 4. The client device executes a command line in the following form ping ipv6-srh <addr0><addr1>-designate_middlenode <addr3, addr2> where -srh <addr0> is used to indicate that an SRH extension header is carried in an IP detection packet, and an anycast address addr0 is carried in a segment list field in the SRH. -designate_nodes <addr3, addr2> is used to indicate that two designate middle nodes addr3 (the router 1) and addr2 (the router 2) need to be sequentially included in ping detection. For example, as shown in FIG. 4, a value of a segment left field is set to 3 (that is, the SRH needs to carry four addresses) as 1 plus a quantity (2) of designate middle nodes is equal to 3, addr0 is carried in a Segment List [0] field, addr1 is carried in a Segment List [1] field, addr2 is carried in a Segment List [2] field, and addr3 is carried in a Segment List [3] field. A DA field in an IPv6 packet header carries addr3. addr3 is an IP address of the first middle node Router 1. A next header field in the SRH indicates the IGMP protocol. In an embodiment, a ping packet may continue to be encapsulated in the IPv6 packet.

The client device generates a first IPv6 packet that is used to perform ping detection and that is to be sent to the router 1. After receiving the packet, the router 1 performs SRH forwarding processing, generates a second IPv6 packet, and sends the second IPv6 packet to the second middle node Router 2. The router 2 performs SRH forwarding processing, generates a third IPv6 packet, and sends the third IPv6 packet to the destination node (the target server served). A principle of SRH forwarding processing procedures on the router 1 and the router 2 is consistent with that of the forwarding procedure in FIG. 1C and FIG. 1D. For the procedures, refer to FIG. 1C and FIG. 1D. For brevity, details are not described again.

After receiving the third IPv6 packet, the server 1 finds, through parsing, that a DA (addr1) carried in the third IPv6 packet is an IPv6 address of the server 1, and continues to parse out SegLeft carried in the SRH extension header. A value of SegLeft is 1, greater than 0. Therefore, it means that when the IP address of the target server is addr1, the server 1 continues to parse out the SRH, subtracts the segment left value in the SRH by 1, and replaces the destination IP address in the IPv6 packet header with an IP address corresponding to Segment List [the segment left value subtracted by 1] (=Segment List [0]=addr0), in an embodiment, replaces addr1 in the IPv6 packet header with addr0.

Subsequent processing of the server 1 is consistent with the foregoing part in FIG. 3. For the subsequent processing, refer to FIG. 3. For brevity, details are not described again.

It should be noted that, for details about the SRH extension packet header in the present disclosure, refer to the document draft-ietf-6man-segment-routing-header-07 published by the IETF. Content of a related part in the document is incorporated herein by reference, appearing as entirely copied. For brevity, details are not described herein.

It should be further noted that IP addresses present in this specification refer to IP unicast addresses unless otherwise specified.

Figure 5A:
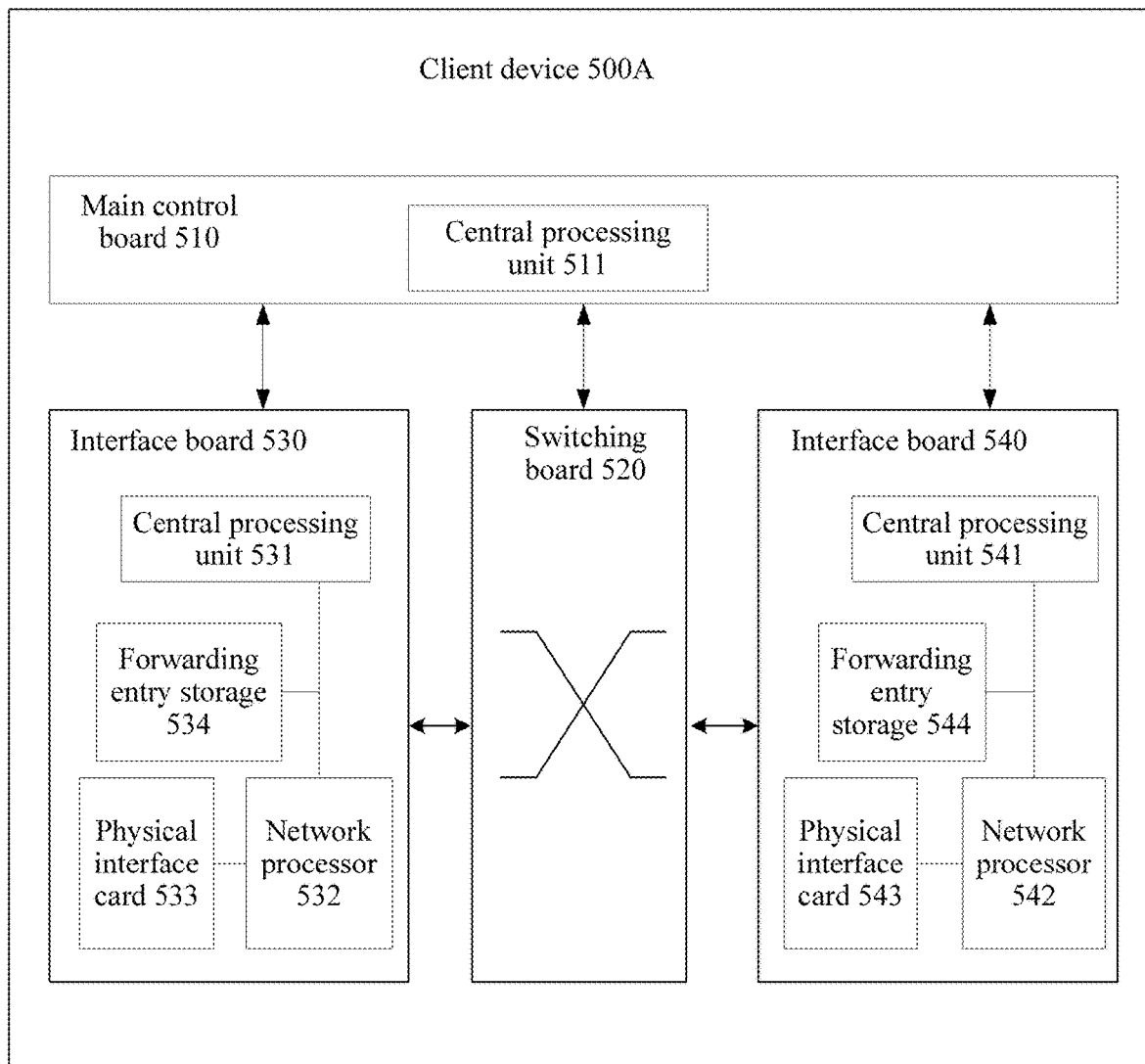
FIG. 5A is a schematic structural diagram of a client device according to an embodiment of the present disclosure.

FIG. 5A is a possible schematic structural diagram of the client device in the foregoing embodiments. The client device 500A is applied to an anycast service-based network, the network includes a client device and an anycast server cluster, the anycast server cluster includes at least two servers, and the at least two servers have a same IP anycast address. The client device 500A includes a main control board 510, an interface board 530, a switching board 520, and an interface board 540. The main control board 510 is configured to complete functions such as system management, device maintenance, and protocol processing. The switching board 520 is configured to complete data exchange between interface boards (the interface board is also referred to as a line card or a service board). The interface board 530 and the interface board 540 are configured to provide various service interfaces (for example, an ethernet interface and a POS interface) and forward a data packet. The main control board 510, the interface board 530, the interface board 540, and the switching board 520 are connected to a platform backboard using a system bus for interworking. A central processing unit 531 on the interface board 530 is configured to control and manage the interface board, and communicate with a central processing unit 511 on the main control board 510. The central processing unit 511 on the main control board 510 is further configured to obtain the IP anycast address of the anycast server cluster and an IP unicast address of a target server, and generate an IP detection packet. The IP detection packet is used to detect whether the target server is reachable based on the IP anycast address. The IP detection packet includes the IP anycast address and the IP unicast address of the target server, and instructs the target server to replace the IP unicast address of the target server with the IP anycast address.

In a possible embodiment, when a path from the client device to the target server does not include a designate middle node, a destination IP address field in the IP detection packet carries the IP unicast address of the target server, a segment list field in an IP SRH in the IP detection packet carries the IP anycast address, a value of a segment left SegLeft field in the IP SRH is 1, and the value of the SegLeft field instructs the target server to replace the IP unicast address of the target server with the anycast address.

In another possible embodiment, when a path from the client device to the target server includes a designate middle node, the central processing unit 511 on the main control board 510 further obtains an IP unicast address of at least one designate middle node on the forwarding path from the client device to the target server. A destination IP address field in the IP detection packet carries an IP unicast address of a first designate middle node, and the first designate middle node is a first designate middle node on the forwarding path from the client device to the target server. A segment list field in an IP SRH in the IP detection packet carries the IP anycast address, the IP unicast address of the target server, and the IP unicast address of the at least one designate middle node, a value of a SegLeft field in the IP SRH is 2 plus a quantity of designate middle nodes, and the value of the SegLeft field instructs the target server to replace the IP unicast address of the target server with the IP anycast address.

The central processing unit 511 on the main control board 510 queries a local routing table using a destination IP address of the IP detection packet to find the interface board 530 on which an outbound interface is located, and then delivers the IP detection packet to the central processing unit 531.

The central processing unit 531 performs internal adaptation processing (for example, interface index conversion) on the IP detection packet by querying a forwarding entry storage 534, and then delivers the IP detection packet to a network processor 532.

The network processor 532 sends the IP detection packet out from a physical interface card 533 after completing link layer encapsulation based on information such as the outbound interface.

The physical interface card 533 receives, within a predetermined time interval, a response packet sent by the target server, and sends the response packet to the network processor 532. The network processor 532 sends, using the central processing unit 531, the response packet upward to the main control board 510 based on a result of searching the forwarding entry storage 534. In this case, the central processing unit 511 determines that the target server is reachable based on the IP anycast address.

When the central processing unit 511 on the main control board 510 receives, within the predetermined time interval, no response packet sent by the target server, the central processing unit 511 determines that the target server is unreachable based on the IP anycast address.

It should be understood that an operation on the interface board 540 is consistent with an operation on the interface board 530 in this embodiment of the present disclosure. For brevity, details are not described. It should be understood that the client device 500A in this embodiment may correspond to the client device in the embodiments corresponding to FIG. 1A to FIG. 4. The main control board 510, and the interface board 530 and/or the interface board 540 in the client device 500A may implement functions of and/or steps implemented by the client device in the embodiments corresponding to FIG. 1A to FIG. 4. For brevity, details are not described herein again.

It should be noted that, there may be one or more main control boards. When there are a plurality of main control boards, the plurality of main control boards may include a primary main control board and a secondary main control board. There may be one or more interface boards, and a forwarding device with a stronger data processing capability provides more interface boards. There may be one or more physical interface cards on the interface board. There may be no switching board, or there may be one or more switching boards. When there are a plurality of switching boards, load balancing and redundancy backup may be jointly implemented by the plurality of switching boards. In a centralized forwarding architecture, a forwarding device may not need a switching board, and an interface board is responsible for a service data processing function of an entire system. In a distributed forwarding architecture, a forwarding device may include at least one switching board, and data is exchanged between a plurality of interface boards using the switching board, to provide a large-capacity data exchange and processing capability. Therefore, a data access and processing capability of the forwarding device in the distributed architecture is stronger than that of the device in the centralized architecture. Optionally, in another form of the forwarding device 500A, there may be only one card. In other words, there is no switching board, and functions of the interface board and the main control board are integrated on the one card. In this case, a central processing unit on the interface board and a central processing unit on the main control board may be combined into one central processing unit on the card, to perform functions of the two central processing units after combination. A device in this form (for example, a network device such as a low-end switch or router) has a relatively weak data exchange and processing capability. A specific architecture to be used depends on a specific networking deployment scenario. This is not limited herein.

Figure 5B:
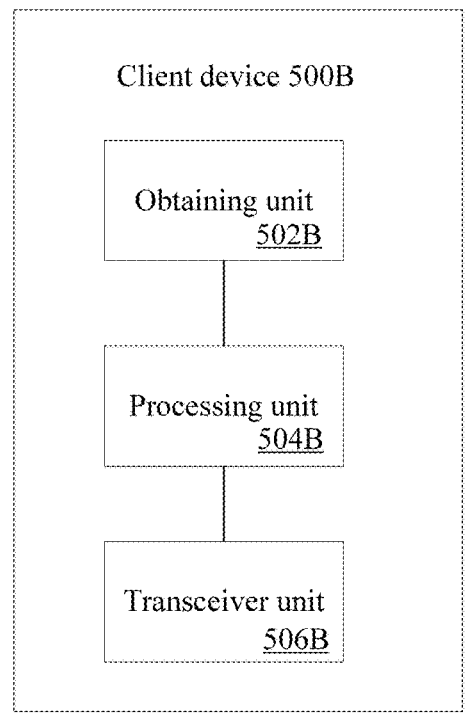
FIG. 5B is a schematic structural diagram of another client device according to an embodiment of the present disclosure.

FIG. 5B is another possible schematic structural diagram of the client device in the foregoing embodiments. The client device 500B is applied to an anycast service-based network, the network includes a client device and an anycast server cluster, the anycast server cluster includes at least two servers, and the at least two servers have a same IP anycast address. The client device 500B includes a processing unit 504B, an obtaining unit 502B, and a transceiver unit 506B.

The obtaining unit 502B is configured to obtain the IP anycast address of the anycast server cluster and an IP unicast address of a target server. The processing unit 504B is configured to generate an IP detection packet. The IP detection packet is used to detect whether the target server is reachable based on the IP anycast address, and the IP detection packet includes the IP anycast address and the IP unicast address of the target server, and instructs the target server to replace the IP unicast address of the target server with the IP anycast address. The transceiver unit 506B is configured to send the IP detection packet to the target server.

In a specific implementation, when a path from the client device to the target server does not include a designate middle node, the obtaining unit 502B is further configured to obtain the IP anycast address and the IP unicast address of the target server using a user-configured command line. Alternatively, the obtaining unit 502B is further configured to receive a message sent by a control management device, and obtain the IP anycast address and the IP unicast address of the target server from the message.

Correspondingly, a method for carrying related information by carrying an SRH in the IP detection packet is consistent with that described in the foregoing part 202. Refer to related content, and details are not described again.

In another specific embodiment, when a path from the client device to the target server includes a designate middle node, the obtaining unit 502B is further configured to obtain an IP unicast address of at least one designate middle node on the forwarding path from the client device to the target server. The obtaining unit 502B is further configured to obtain the IP unicast address of the at least one designate middle node using a user-configured command line. Alternatively, the obtaining unit 502B is further configured to receive a message sent by the control management device, and obtain the IP unicast address of the at least one designate middle node from the message.

Correspondingly, a method for carrying related information by carrying an SRH in the IP detection packet is consistent with that described in the foregoing part 202. Refer to related content, and details are not described again.

When the transceiver unit 506B receives, within a predetermined time interval, a response packet sent by the target server, the processing unit 504B determines that the target server is reachable based on the IP anycast address.

When the transceiver unit 506B receives, within the predetermined time interval, no response packet sent by the target server, the processing unit 504B determines that the target server is unreachable based on the IP anycast address.

The client device 500B in this embodiment of the present disclosure may correspond to the client device in the foregoing packet sending method embodiments, and modules and the other operations and/or functions of the client device 500B are separately used to implement steps and methods that are implemented by the client device in the embodiments corresponding to FIG. 1A to FIG. 4. For brevity, details are not described herein again.

Figure 5C:
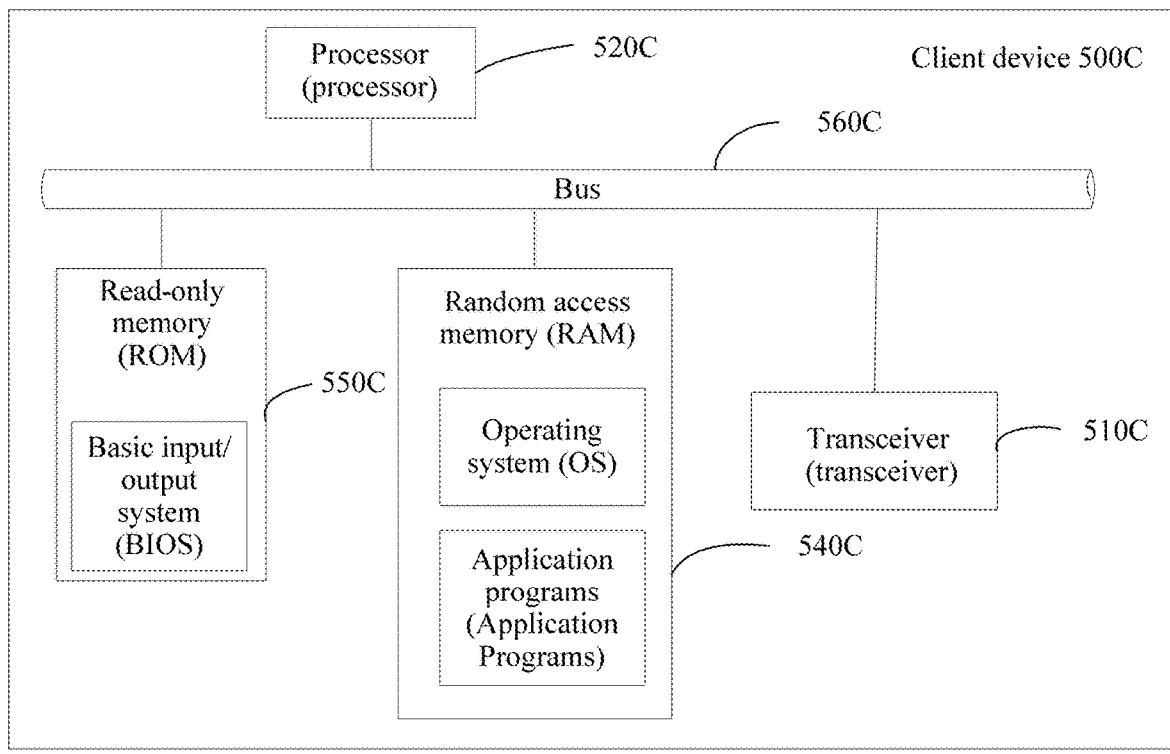
FIG. 5C is a schematic structural diagram of still another client device according to an embodiment of the present disclosure.

FIG. 5C is a possible schematic structural diagram of the client device in the foregoing embodiments. The client device 500C is applied to an anycast service-based network, the network includes a client device and an anycast server cluster, the anycast server cluster includes at least two servers, and the at least two servers have a same IP anycast address. The client device 500C includes a transceiver 510C, a processor 520C, a random access memory 540C, a read-only memory 550C, and a bus 560C. The processor 520C is separately coupled to the transceiver 510C, the random access memory 540C, and the read-only memory 550C using the bus 560C. When the forwarding device 500C needs to be run, a bootloader in a basic input/output system or an embedded system that is built into the read-only memory 550C is used to lead a system to start, and lead the forwarding device 500C to enter a normal running state. After the forwarding device 500C enters the normal running state, an application program and an operating system are run in the random access memory 540C, to implement the following functions.

The processor 520C is configured to obtain the IP anycast address of the anycast server cluster and an IP unicast address of a target server, and generate an IP detection packet. The IP detection packet is used to detect whether the target server in the at least two servers is reachable based on the IP anycast address. The IP detection packet includes the IP anycast address and the IP unicast address of the target server, and instructs the target server to replace the IP unicast address of the target server with the IP anycast address. The transceiver 510C is configured to send the IP detection packet to the target server.

The forwarding device 500C in this embodiment of the present disclosure may correspond to the client device in the embodiments corresponding to FIG. 1A to FIG. 4. In addition, the processor 520C, the transceiver 510C, and the like in the client device 500C may implement functions of and/or steps and methods implemented by the client device in the embodiments corresponding to FIG. 1A to FIG. 4. The processor 520C is configured to perform all operations of the processing unit 504B and the obtaining unit 502B of the client device in FIG. 5B, and the transceiver 510C is configured to perform all operations of the transceiver unit 506B of the client device in FIG. 5B. For brevity, details are not described herein again.

It should be noted that, in this embodiment, the client device may alternatively be implemented based on a common physical server and a network function virtualization (NFV) technology, and the client device is a virtual client device (for example, a virtual host, a virtual router, or a virtual switch). The virtual client device may be a virtual machine (VM) that runs a program used to send a packet, and the VM is deployed on a hardware device (for example, a physical server). The VM is a complete computer system that is simulated using software, that has functions of a complete hardware system, and that runs in a completely isolated environment. After reading this application, a person skilled in the art may obtain, on a common physical server using the NFV technology, a plurality of virtualized forwarding devices with the foregoing functions. Details are not described herein.

It should be understood that, based on this application, a person skilled in the art can combine optional features, steps, or methods that are described in the embodiments of this application without creative efforts, and this belongs to the embodiments disclosed in this application. For brevity, descriptions of different combinations are not repeatedly provided.

The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present disclosure essentially, or the part contributing to other approaches, or some of the technical solutions may be implemented in a form of a software product. The computer software product is stored in a storage medium, and includes several instructions for instructing a computer device (which may be a PC, a server, a network device, or the like) to perform all or some of the steps of the methods described in the embodiments of the present disclosure. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet sending method applied to an anycast service-based network wherein the packet sending method is implemented by a client device and comprises:
    obtaining an Internet Protocol (IP) anycast address and a first IP unicast address of a target server in at least two servers, wherein the anycast service-based network comprises the client device and an anycast server cluster, wherein the anycast server cluster comprises the at least two servers, and wherein the at least two servers have a same IP anycast address;
    generating an IP detection packet to detect whether the target server is reachable based on the IP anycast address, wherein the IP detection packet comprises the IP anycast address and the first IP unicast address, and wherein the IP detection packet instructs the target server to replace the first IP unicast address with the IP anycast address; and
    sending the IP detection packet to the target server.

2. The packet sending method of claim 1, further comprising further obtaining the IP anycast address and the first IP unicast address using a user-configured command line.

3. The packet sending method of claim 1, wherein a destination IP address field in the IP detection packet carries the first IP unicast address, wherein a segment list field in an IP segment routing header (SRH) in the IP detection packet carries the IP anycast address, wherein a value of a segment left (SegLeft) field in the IP SRH is 1, and wherein the value of the SegLeft field instructs the target server to replace the first IP unicast address with the IP anycast address.

4. The packet sending method of claim 1, further comprising obtaining, using a user-configured command line, a second IP unicast address of at least one designate middle node on a forwarding path from the client device to the target server.

5. The packet sending method of claim 4, wherein a destination IP address field in the IP detection packet carries a third IP unicast address of a first designate middle node on the forwarding path from the client device to the target server, wherein a segment list field in an IP SRH in the IP detection packet carries the IP anycast address, the first IP unicast address, and the second IP unicast address, wherein a value of a SegLeft field in the IP SRH is 1 plus a quantity of designate middle nodes, and wherein the value of the SegLeft field instructs the target server to replace the first IP unicast address with the IP anycast address when the value of the SegLeft field is 1.

6. The packet sending method of claim 1, wherein the response packet corresponds to the IP detection packet, and wherein the packet sending method further comprises:

determining that the target server is reachable based on the IP anycast address when receiving a response packet from the target server within a predetermined time interval; or determining that the target server is unreachable based on the IP anycast address when not receiving the response packet from the target server within the predetermined time interval.

7. The packet sending method of claim 1, further comprising:

receiving a message from a control management device; and obtaining the IP anycast address and the first IP unicast address from the message.

8. The packet sending method of claim 1, further comprising:

obtaining a second IP unicast address of at least one designate middle node on a forwarding path from the client device to the target server; and receiving a message from a control management device and obtaining the second IP unicast address from the message.

9. A client device applied to an anycast service-based network, wherein the client device comprises:

a transceiver;

a processor coupled to the transceiver; and a memory coupled to the processor and storing instructions that, when executed by the processor, cause the client device to be configured to:

obtain an Internet Protocol (IP) anycast address of an anycast server cluster and a first IP unicast address of a target server in at least two servers, wherein the anycast service-based network comprises the client device and the anycast server cluster, wherein the anycast server cluster comprises the at least two servers, and wherein the at least two servers have a same IP anycast address;

generate an IP detection packet to detect whether the target server is reachable based on the IP anycast address, wherein the IP detection packet comprises the IP anycast address and the first IP unicast address, and wherein the IP detection packet instructs the target server to replace the first IP unicast address with the IP anycast address; and send, via the transceiver, the IP detection packet to the target server.

10. The client device of claim 9, wherein the instructions further cause the processor to be configured to obtain the IP anycast address and the first IP unicast address using a user-configured command line; or wherein the transceiver is configured to receive a message from a control management device, and the processor is configured to obtain the IP anycast address and the first IP unicast address from the message.

11. The client device of claim 9, wherein a destination IP address field in the IP detection packet carries the first IP unicast address, wherein a segment list field in an IP segment routing header (SRH) in the IP detection packet carries the IP anycast address, wherein a value of a segment left (SegLeft) field in the IP SRH is 1, and wherein the value of the SegLeft field instructs the target server to replace the first IP unicast address with the IP anycast address.

12. The client device of claim 9, wherein the instructions further cause the processor to be configured to obtain a second IP unicast address of at least one designate middle node on a forwarding path from the client device to the target server using a user-configured command line or receiving a message from a control management device.

13. The client device of claim 12, wherein a destination IP address field in the IP detection packet carries a third IP unicast address of a first designate middle node, wherein the first designate middle node is a designate middle node on the forwarding path from the client device to the target server, wherein a segment list field in an IP SRH in the IP detection packet carries the IP anycast address, the first IP unicast address, and the second IP unicast address, wherein a value of a SegLeft field in the IP SRH is 1 plus a quantity of designate middle nodes, and wherein the value of the SegLeft field instructs the target server to replace the first IP unicast address with the IP anycast address when the value of the SegLeft field is 1.

14. The client device of claim 9, wherein the instructions further cause the processor to be configured to:

determine that the target server is reachable based on the IP anycast address when the transceiver receives a response packet from the target server within a predetermined time interval; or determine that the target server is unreachable based on the IP anycast address when the transceiver does not receive the response packet from the target server within the predetermined time interval.

15. A computer program product comprising computer-executable instructions stored on a non-transitory computer-readable medium that, when executed by a processor, cause a client device to:

obtain an Internet Protocol (IP) anycast address of an anycast server cluster and a first IP unicast address of a target server in at least two servers, wherein the anycast server cluster comprises the at least two servers, and wherein the at least two servers have a same IP anycast address;

generate an IP detection packet to detect whether the target server is reachable based on the IP anycast address, wherein the IP detection packet comprises the IP anycast address and the first IP unicast address, and wherein the IP detection packet instructs the target server to replace the first IP unicast address with the IP anycast address; and send the IP detection packet to the target server.

16. The computer program product of claim 15, wherein the instructions further cause the client device to:

obtain the IP anycast address and the first IP unicast address using a user-configured command line; or receive a message from a control management device and obtain the IP anycast address and the first IP unicast address from the message.

17. The computer program product of claim 15, wherein a destination IP address field in the IP detection packet carries the first IP unicast address, wherein a segment list field in an IP segment routing header (SRH) in the IP detection packet carries the IP anycast address, wherein a value of a segment left (SegLeft) field in the IP SRH is 1, and wherein the value of the SegLeft field instructs the target server to replace the first IP unicast address with the IP anycast address.

18. The computer program product of claim 15, wherein the instructions further cause the client device to:

obtain, using a user-configured command line, a second IP unicast address of at least one designate middle node on a forwarding path from the client device to the target server; or receive a message from a control management device and obtain the second IP unicast address from the message.

19. The computer program product of claim 18, wherein a destination IP address field in the IP detection packet carries a third IP unicast address of a first designate middle node on the forwarding path from the client device to the target server, wherein a segment list field in an IP SRH in the IP detection packet carries the IP anycast address, the first IP unicast address, and the second IP unicast address, wherein a value of a SegLeft field in the IP SRH is 1 plus a quantity of designate middle nodes, and wherein the value of the SegLeft field instructs the target server to replace the first IP unicast address with the IP anycast address when the value of the SegLeft field is 1.

20. The computer program product of claim 15, wherein the instructions further cause the client device to:
- determine that the target server is reachable based on the IP anycast address when receiving a response packet from the target server within a predetermined time interval; or
- determine that the target server is unreachable based on the IP anycast address when not receiving the response packet from the target server within the predetermined time interval, wherein the response packet corresponds to the IP detection packet.

\* \* \* \* \*